US010606606B1

(12) United States Patent
Santharam et al.

(10) Patent No.: US 10,606,606 B1
(45) Date of Patent: Mar. 31, 2020

(54) MULTI-PLATFORM FIRMWARE SUPPORT

(71) Applicant: American Megatrends International, LLC, Norcross, GA (US)

(72) Inventors: Madhan B. Santharam, Duluth, GA (US); Presanna Raman, Suwanee, GA (US); Paul Anthony Rhea, Lawrenceville, GA (US); Stefano Righi, Lawrenceville, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 154 days.

(21) Appl. No.: 15/496,744

(22) Filed: Apr. 25, 2017

(51) Int. Cl.
*G06F 9/44* (2018.01)
*G06F 9/4401* (2018.01)

(52) U.S. Cl.
CPC .................... *G06F 9/441* (2013.01)

(58) Field of Classification Search
CPC ..................... G06F 1/32; G06F 1/28
See application file for complete search history.

(56) References Cited

U.S. PATENT DOCUMENTS

| 8,370,618 B1* | 2/2013 | Yakovlev | G06F 13/102 |
| | | | 709/222 |
| 9,250,919 B1* | 2/2016 | Narey | G06F 9/441 |
| 2002/0194313 A1* | 12/2002 | Brannock | G06F 8/65 |
| | | | 709/220 |
| 2007/0156698 A1* | 7/2007 | Gebhart | G06F 17/30112 |
| 2009/0007089 A1* | 1/2009 | Rothman | G06F 8/65 |
| | | | 717/168 |
| 2010/0332813 A1* | 12/2010 | Rothman | G06F 9/4401 |
| | | | 713/2 |
| 2016/0188345 A1* | 6/2016 | Chen | G06F 9/4403 |
| | | | 713/2 |

* cited by examiner

*Primary Examiner* — Mohammed H Rehman
*Assistant Examiner* — Keshab R Pandey
(74) *Attorney, Agent, or Firm* — Newport IP, LLC; Benjamin A. Keim

(57) ABSTRACT

A firmware development tool generates platform-specific firmware images for a multitude of different computing platforms. A multi-platform firmware image creation tool receives the platform-specific firmware images and generates a multi-platform firmware image therefrom. A portion of the multi-platform firmware image includes firmware files that are common across all of the platform-specific firmware images. Other portions of the multi-platform firmware image include firmware files that are specific to each of the platform-specific firmware images. At boot time of a computer system utilizing the multi-platform firmware image, the platform that the computer system uses is detected. The firmware files that are common across the platform-specific firmware images are then loaded into memory. The firmware files that are specific to the detected platform are also loaded into memory. Once the firmware files have been loaded into memory, they can be executed to boot the computer system and provide other types of functionality.

20 Claims, 6 Drawing Sheets

MULTI-PLATFORM FIRMWARE SUPPORT

BACKGROUND

It is not uncommon for an original equipment manufacturer ("OEM") to develop and manufacture different versions of the same computer system motherboard. These different versions of the same computer system motherboard are commonly referred to as stock keeping units ("SKUs"). For example, multiple versions of a server motherboard can be developed that have many hardware components, such as a chip set, in common. These different versions of the same motherboard can also have different hardware components. One version of a server motherboard might include, for instance, hardware support for redundant array of inexpensive disks ("RAID"). Another variation of the same motherboard might include additional hardware network adapters or other differentiating hardware components.

Different hardware platforms, such as those described above, commonly require firmware containing different executable code and static data in order to support their operation. For example, and without limitation, different platforms might require different firmware drivers or different static data, such as interrupt request ("IRQ") routing tables, setup screens or defaults, and system management BIOS ("SMBIOS") data. A single firmware that supports multiple platforms is utilized in some computing systems. This type of firmware can, however, be complex, difficult to test and maintain, bloated, and inefficient. As a result, such firmware can be unreliable and negatively impact the performance of computing systems that utilize such firmware.

It is with respect to these and other considerations that the disclosure made herein is presented.

SUMMARY

Technologies are described herein for providing multi-platform support in a computer system firmware. Through an implementation of the technologies disclosed herein, a single firmware that supports multiple hardware platforms can be generated in a simple and efficient manner. These mechanisms can also reduce the time required for development and testing of computer system firmware for multiple hardware platforms and, potentially, reduce the number of errors found in computer system firmware. Technical benefits other than those specifically mentioned herein can also be realized through an implementation of the technologies disclosed herein.

In one configuration, a firmware development tool generates platform-specific firmware images for a multitude of different computing platforms. A multi-platform firmware image creation tool receives the platform-specific firmware images and generates a multi-platform firmware image therefrom. A portion of the multi-platform firmware image includes firmware files that are common across all of the platform-specific firmware images. Other portions of the multi-platform firmware image include firmware files that are specific to each of the platform-specific firmware images.

At boot time of a computer system that utilizes the multi-platform firmware image, the platform that the computer system adopts is detected. The firmware files that are common across the platform-specific firmware images are then loaded into memory. The firmware files that are specific to the detected platform are also loaded into memory. Once the firmware files have been loaded into memory, they can be executed to boot the computer system and provide other types of functionality.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing multi-platform support in a computer system firmware. As discussed briefly above, through an implementation of the technologies disclosed herein, a single firmware that supports multiple hardware platforms can be generated in a simple and efficient manner. These mechanisms can also reduce the time required for development and testing of computer system firmware for multiple hardware platforms and, potentially, reduce the number of errors found in computer system firmware. Additional details regarding these aspects will be provided below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
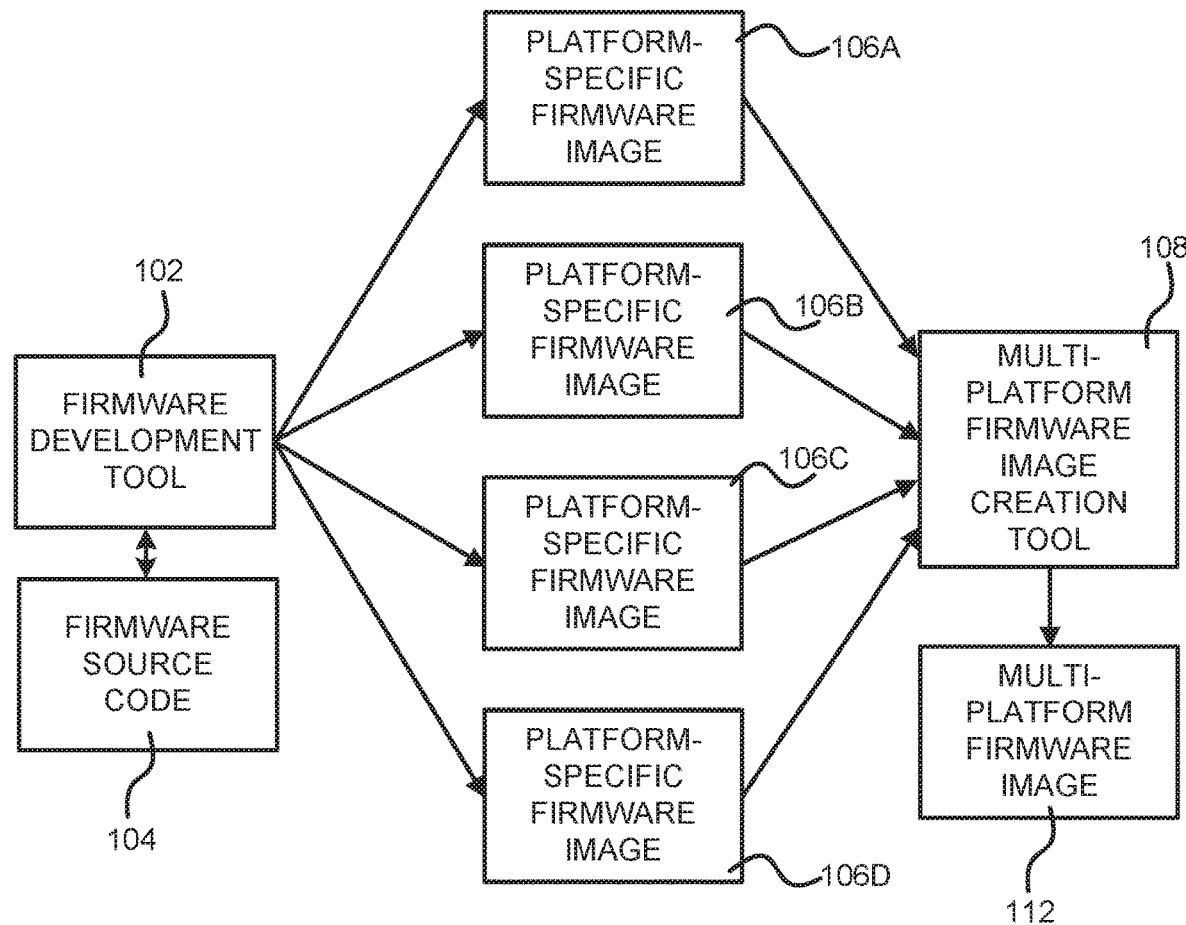
FIG. 1 is a software architecture diagram illustrating aspects of the operation of a firmware development tool and a multi-platform image creation tool, according to one or more configurations presented herein.

FIG. 1 is a software architecture diagram illustrating aspects of the operation of a firmware development tool 102 and a multi-platform image creation tool 108, according to one or more configurations presented herein. As shown in FIG. 1, a firmware development tool 102 can be utilized to create firmware source code 104. The firmware source code 104 is source code for implementing a computer system firmware for use in multiple computing system platforms. A platform is a specific hardware implementation of a computing system. The different platforms can have various hardware components in common. For example, and without limitation, multiple versions of a server motherboard can be developed that have many hardware components, such as a chip set, in common.

These different versions of the same motherboard can also have different hardware components. One version of a server motherboard might include, for instance, hardware support for redundant array of inexpensive disks ("RAID"). Another variation of the same motherboard might include additional hardware network adapters or other differentiating hardware components. As shown in FIG. 1, the firmware development tool 102 can be utilized to generate platform-specific firmware images 106A-106D. Each of the platform-specific firmware images 106A-106D includes executable firmware files for supporting a different platform.

Figure 2A:
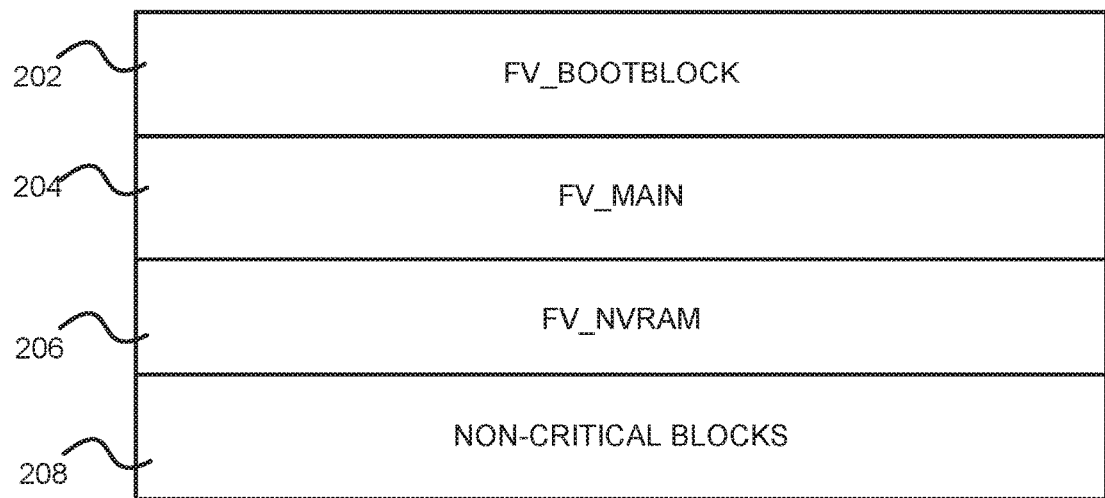
FIGS. 2A and 2B are data structure diagrams illustrating aspects of the configuration of a platform-specific firmware image and a multi-platform firmware image, respectively, according to one configuration presented herein.

Turning momentarily to FIG. 2A, additional details regarding the structure of a platform-specific firmware image 106 will be provided. In particular, in one configuration the platform-specific firmware image 106 includes a firmware file system ("FFS") volume 202 ("FV_BOOTBLOCK") that includes uncompressed program code that is executed upon initial power-up of a computing system. The platform-specific firmware image 106 also includes an FFS volume 204 ("FV_MAIN") that stores the remainder of the firmware in a compressed format. The FFS volume 202 also includes program code for decompressing the contents of the FFS volume 204.

The platform-specific firmware image 106 also includes an FFS volume 206 ("FV_NVRAM") that includes the contents of non-volatile random access memory ("NVRAM") for the computer system executing the firmware. The platform-specific firmware image 106 can also include other non-critical blocks 208 in some configurations.

Turning back to FIG. 1, additional aspects of the creation of a multi-platform firmware image 112 will be described. As shown in FIG. 1, a multi-platform image creation tool 108 obtains the platform-specific firmware images 106A-106D for the multiple computing platforms. Using the platform-specific firmware images 106A-106D, the multi-platform image creation tool 108 creates a multi-platform firmware image 112. The multi-platform firmware image 112 is a single firmware image that supports the platforms supported by the platform-specific firmware images 106A-106D. Although four different platforms are represented in FIG. 1, it is to be appreciated that the multi-platform firmware image 112 can support other numbers of platforms in other configurations.

Figure 2B:
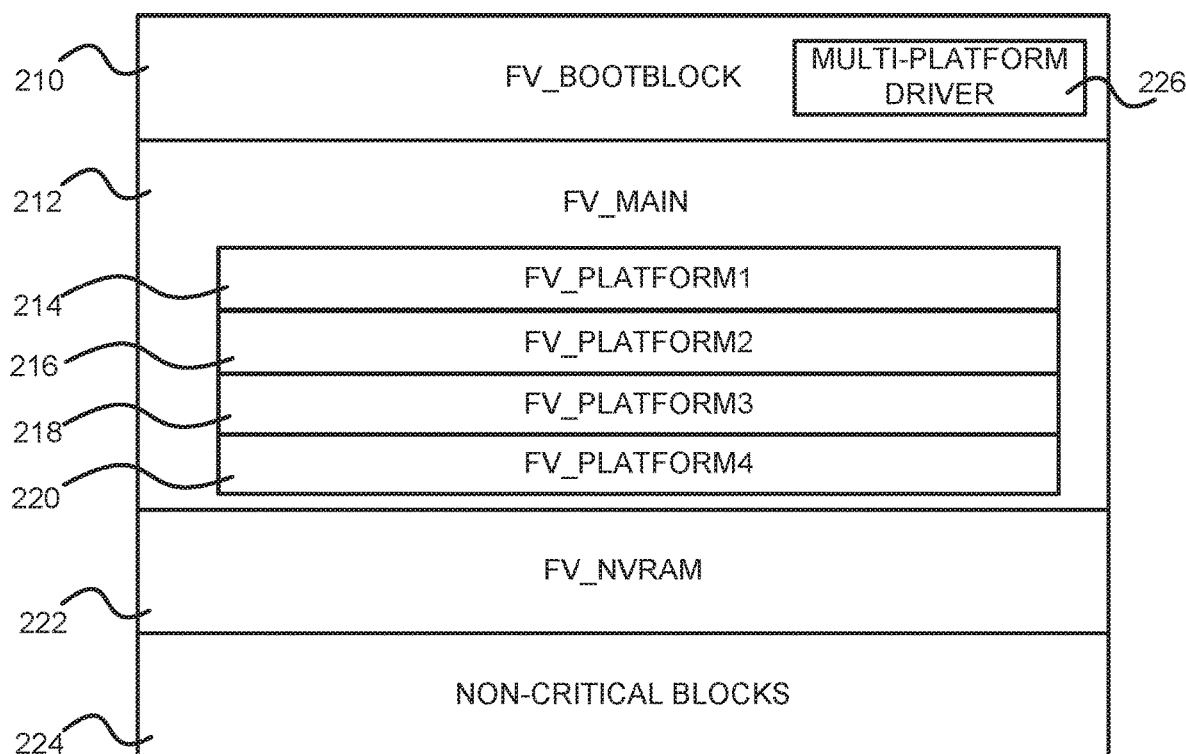

Turning momentarily to FIG. 2B, details regarding a format utilized by the multi-platform firmware image 112 in one particular configuration will be provided. As shown in FIG. 2B, the multi-platform firmware image 112 includes a FFS volume 210 ("FV_BOOTBLOCK") that includes uncompressed program code that is executed upon initial power-up of a computing system. In one configuration, however, the FFS volume 210 also includes a multi-platform driver 226. As will be discussed in greater detail below, the multi-platform driver 226 includes functionality for identifying a platform upon which a firmware is executing and then loading the firmware files specific to the identified firmware into memory for execution.

As also shown in FIG. 2B, the multi-platform firmware image 112 also includes a FFS volume 212 ("FV_MAIN"). The FFS volume 212 stores program files that each of the platform-specific firmware images 106A-106D have in common. In one configuration, the FFS volume 212 also includes nested FFS volumes 214, 216, 218, and 220. The FFS volumes 214, 216, 218, and 220 include program files that are specific to the platform-specific firmware images 106A-106D. In the example shown in FIG. 2B, for instance, the FFS volume 214 includes files that are unique to the platform-specific firmware image 106A, the FFS volume 216 includes files that are unique to the platform-specific firmware image 106B, the FFS volume 218 includes files that are unique to the platform-specific firmware image 106C, and the FFS volume 220 includes files that are unique to the platform-specific firmware image 106D. As shown in FIG. 2B, the multi-platform firmware image 112 can also include an FFS volume 222 for storing the contents of NVRAM and an FFS volume 224 for storing other non-critical blocks.

Referring back to FIG. 1, additional aspects of the creation of the multi-platform firmware image 112 will be described. In particular, in order to generate the multi-platform firmware image 112, the multi-platform image creation tool 108 performs a discovery phase and an execution phase. During the discovery phase, the multi-platform image creation tool 108 identifies those firmware files that are common across the platform-specific firmware images 106A-106D. The multi-platform firmware creation tool 108 also identifies those files that are unique to each of the platform-specific firmware images 106A-106D. The multi-platform image creation tool 108 then creates a report (not shown in FIG. 1) listing the common and different files in the platform-specific firmware images 106A-106D.

During the execution phase of operation, the multi-platform image creation tool 108 utilizes the report generated during the discovery phase to generate the multi-platform firmware image 112. In particular, the multi-platform image creation tool 108 copies the files that the platform-specific firmware images 106A-106D have in common to the FFS volume 212 ("FV_MAIN"). The multi-platform image creation tool 108 also copies the files that are unique to each of the platform-specific firmware images 106A-106D to the respective FFS volume 214, 216, 218, and 220. Additional details regarding this process will be provided below with regard to FIG. 3.

Figure 3:
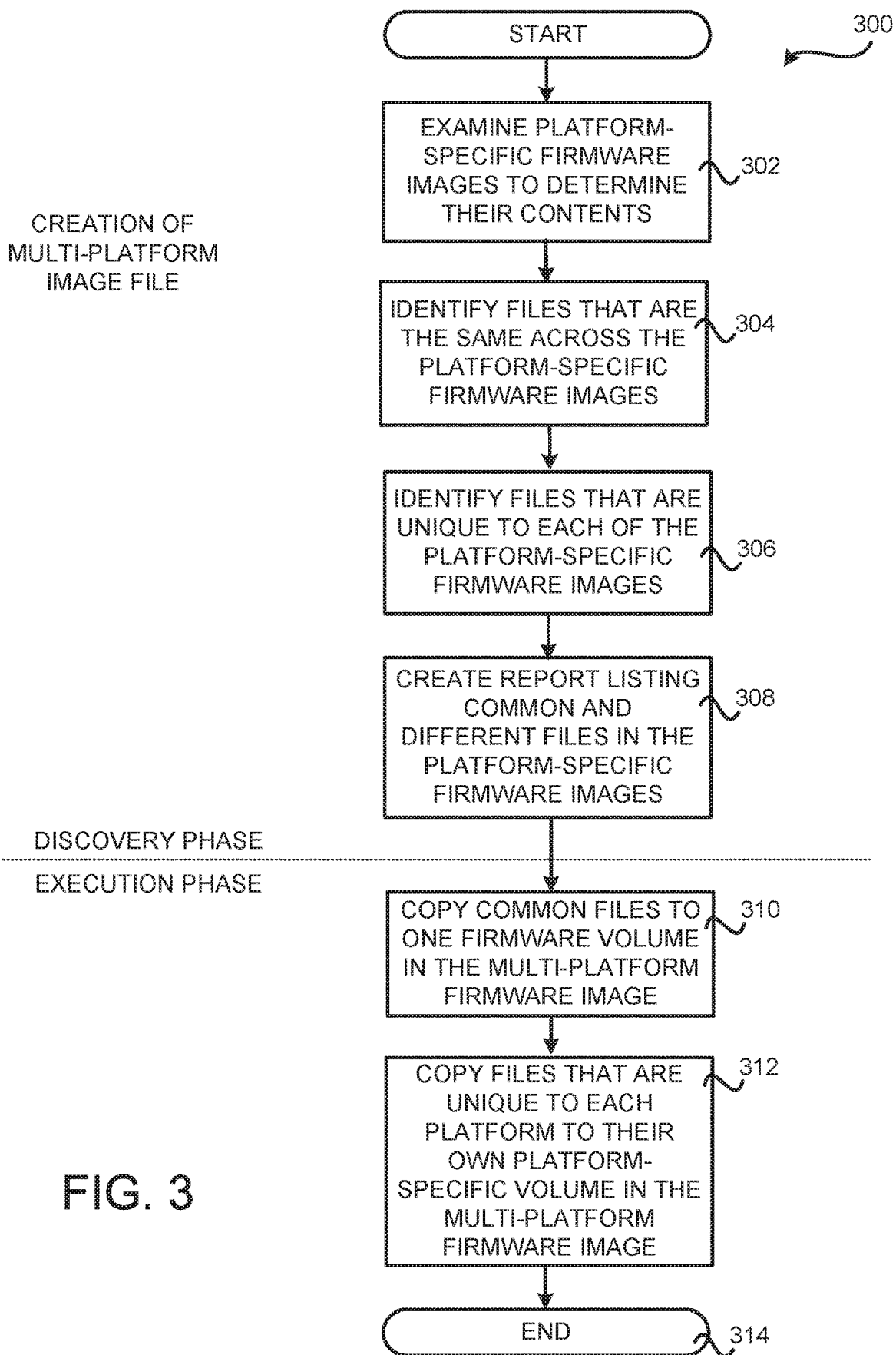
FIG. 3 is a flow diagram showing a routine that illustrates additional aspects of the operation of the multi-platform image creation tool shown in FIG. 1, according to one configuration disclosed herein.

FIG. 3 is a flow diagram showing a routine 300 that illustrates additional aspects of the operation of the multi-platform image creation tool 108 shown in FIG. 1 and described above, according to one configuration disclosed herein. It should be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

As discussed briefly above, in order to generate the multi-platform firmware image 112, the multi-platform image creation tool 108 performs a discovery phase and an execution phase in one particular configuration. The discovery phase is illustrated by operations 302-308 of the routine 300 and the execution phase is illustrated by operations 310-314 of the routine 300.

The discovery phase begins at operation 302 of routine 300, where the multi-platform image creation tool 108 examines the platform-specific firmware images 106 to determine their contents. The routine 300 then proceeds from operation 302 to operation 304, where the multi-platform image creation tool 108 identifies the files in the platform-specific firmware images 106 that are common across each of the platform-specific firmware images 106. The common files can be identified using the globally unique identifier ("GUID") assigned to each of the files to identify files that are potentially the same. A comparison of the content of the files can then be performed in order to verify that the files are in fact the same. From operation 304, the routine 300 proceeds to operation 306.

At operation 306, the multi-platform image creation tool 108 identifies those files in the platform-specific firmware images 106 that are unique to each of the platform-specific firmware images 106. The unique files can be identified based on the GUID assigned to each of the files and the content of the files. The routine 300 then proceeds from operation 306 to operation 308, where the multi-platform image creation tool 108 creates a report listing the common and different files in the platform-specific firmware images 106. The routine 300 then proceeds from operation 308 to operation 310.

The execution phase of operation begins at operation 310, where the multi-platform image creation tool 108 utilizes the report generated during the discovery phase to generate the multi-platform firmware image 112. In particular, the multi-platform image creation tool 108 copies the files that the platform-specific firmware images 106 have in common to the FFS volume 212 at operation 310. The multi-platform image creation tool 108 also copies the files that are unique to each of the platform-specific firmware images 106 to the respective FFS volume 214, 216, 218, and 220 in the multi-platform firmware image 112 at operation 312.

Figure 4:
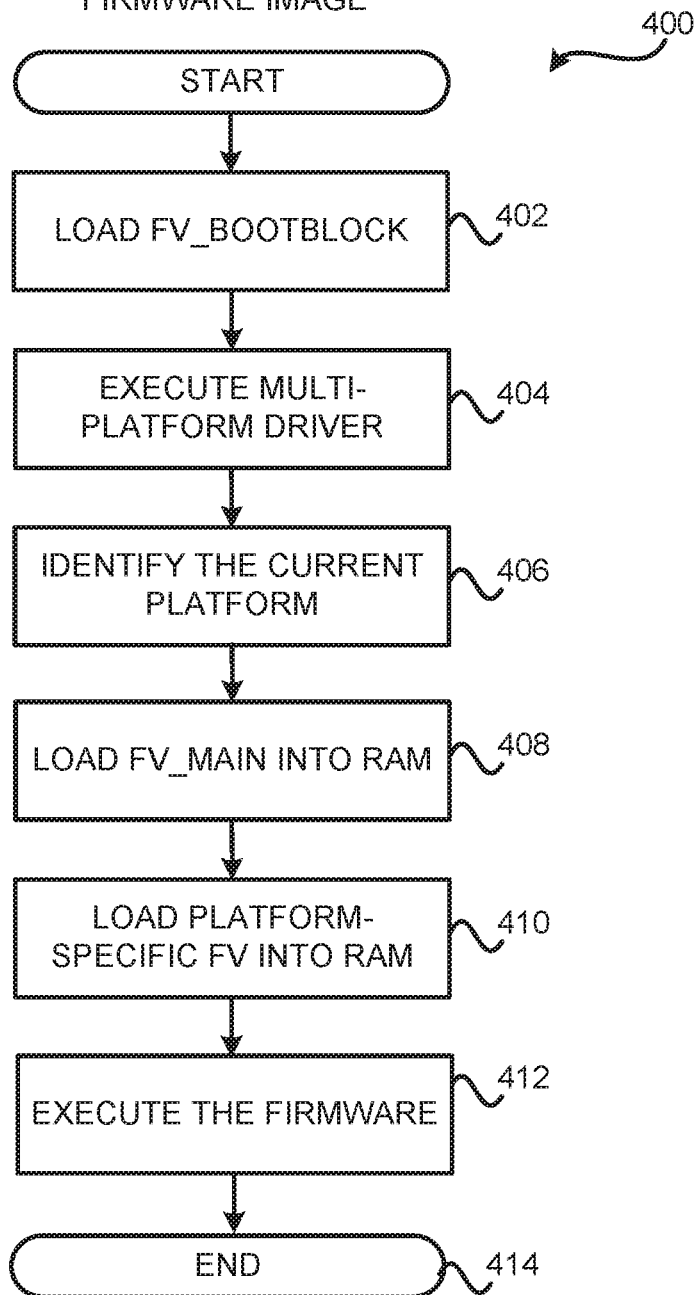
FIG. 4 is a flow diagram showing a routine that illustrates a process for booting a computer using the multi-platform firmware image shown in FIG. 2B, according to one configuration disclosed herein.

FIG. 4 is a flow diagram showing a routine 400 that illustrates a process for booting a computer, such as that shown in FIG. 6, which is described below, using the multi-platform firmware image 112 shown in FIGS. 1 and 2B, according to one configuration disclosed herein. The routine 400 begins at operation 402, where the computer begins booting by loading the contents of the firmware volume FV_BOOTBLOCK 210. As discussed above, this firmware volume FV_BOOTBLOCK 210 includes the multi-platform driver 226. The computer loads the multi-platform driver 226 at operation 404. The routine 400 then proceeds from operation 404 to operation 406.

At operation 406, the multi-platform driver 226 identifies the platform of the computer that it is executing upon, for example by examining the hardware of the computer. For example, and without limitation, the configuration of general purpose I/O ("GPIO") pins in the computer might be examined in order to identify the platform of the computer. Other mechanisms can be utilized in other configurations.

The routine 400 then proceeds from operation 406 to operation 408, where the multi-platform driver 226 loads the contents of the firmware volume FV_MAIN 212 into random access memory ("RAM"). If the contents of the firmware volume FV_MAIN 212 are compressed, the contents of the firmware volume FV_MAIN 212 can be decompressed prior to loading into RAM. The routine 400 then proceeds from operation 408 to operation 410.

At operation 410, the multi-platform driver 226 loads the contents of the platform-specific firmware volume 214, 216, 218, or 220 corresponding to the platform identified at operation 406 into RAM. The contents of the loaded platform-specific firmware volume can also be decompressed if required. Once the contents of the platform-specific firmware volume 214, 216, 218, or 220 have been loaded into RAM, the firmware can be executed. The routine 400 then proceeds from operation 412 to operation 414, where it ends.

Figure 5:
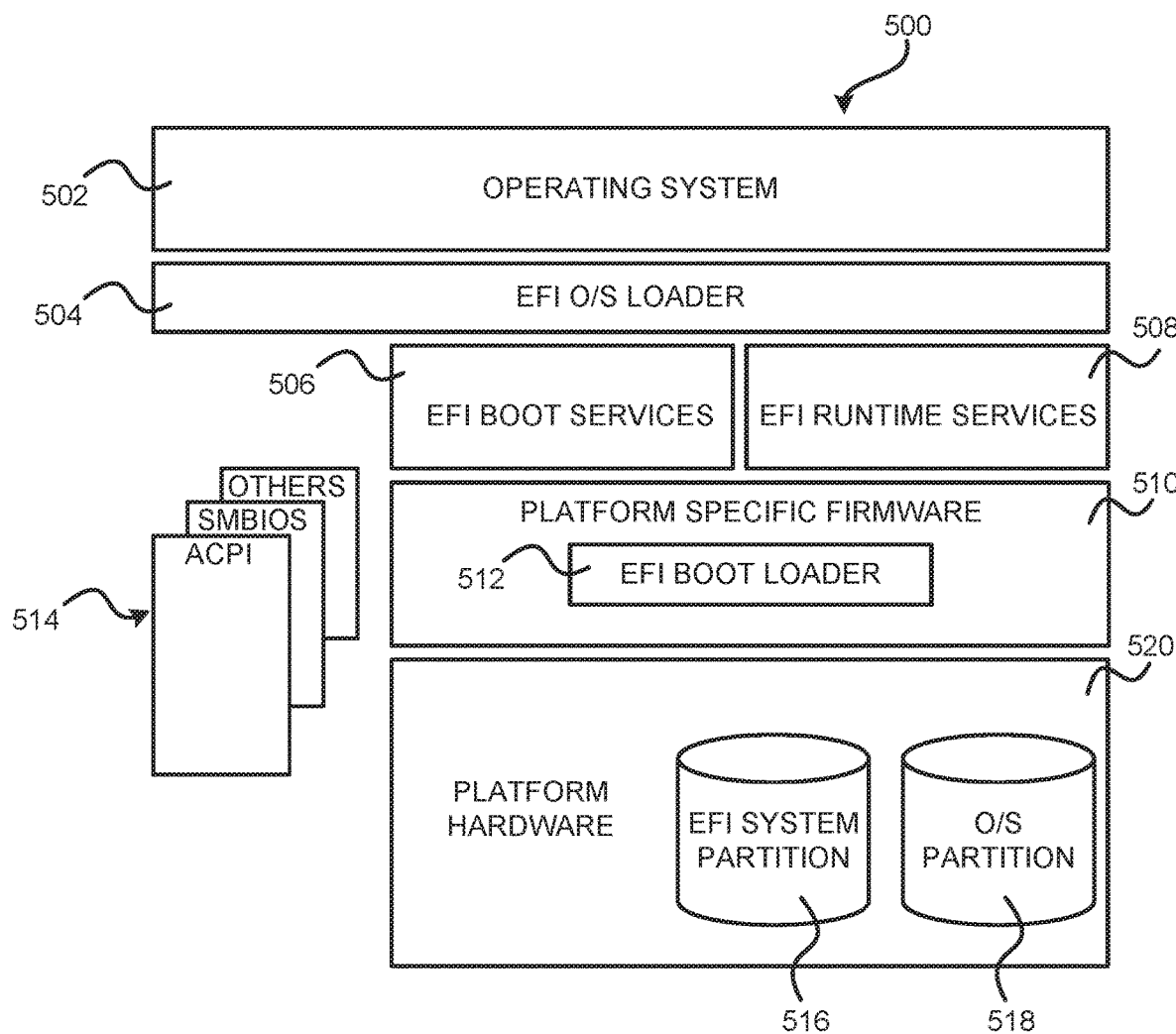
FIG. 5 is a software architecture diagram illustrating a software architecture for an extensible firmware interface ("EFI")-compliant firmware that provides an operating environment for the technologies presented herein in one particular configuration.

Turning now to FIG. 5, a software architecture diagram will be described that illustrates an architecture for a UEFI Specification-compliant firmware that can be created using the technologies disclosed herein. The UEFI Specification describes an interface between an operating system 502 and a UEFI Specification-compliant firmware. The UEFI Specification also defines an interface that the firmware can implement, and an interface that the operating system 502 can use while booting. How the firmware implements the interface can be left up to the manufacturer of the firmware. The UEFI Specification also defines a way for the operating system 502 and firmware to exchange information necessary to support the operating system boot process. The term "UEFI Specification" used herein refers to both the EFI Specification developed by INTEL CORPORATION and the UEFI Specification managed by the UEFI FORUM.

As shown in FIG. 5, the architecture can include platform hardware 520 and an operating system 502. The boot loader 512 for the operating system ("OS" or "O/S") can be retrieved from the UEFI system partition 516 using an UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 506 can provide interfaces for devices and system functionality used during boot time. UEFI runtime services 508 can also be available to the UEFI OS loader 504 during the boot phase. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 6:
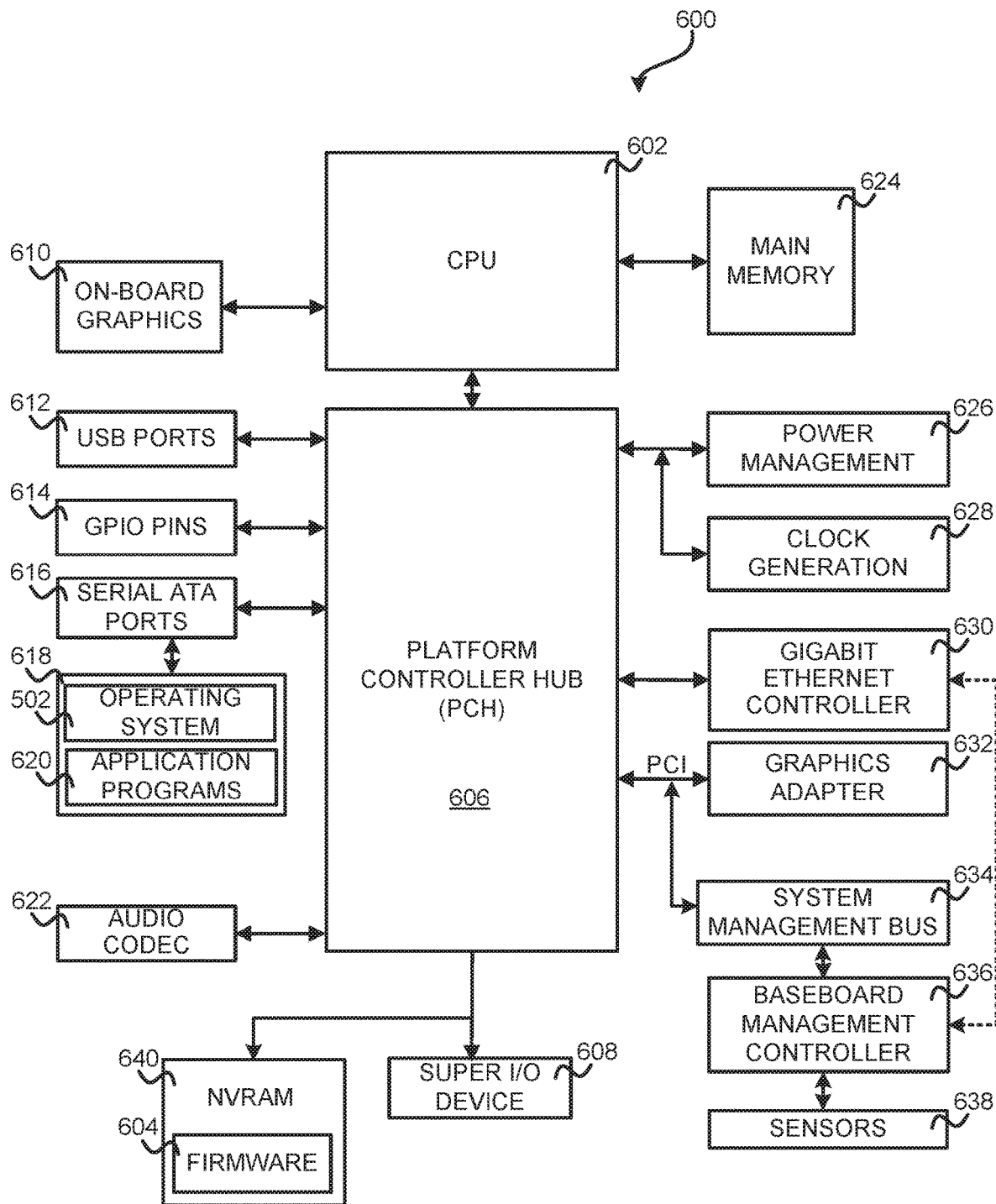
FIG. 6 is a computer architecture diagram that shows an illustrative architecture for a computer that can provide an operating environment for the technologies disclosed herein.

Referring now to FIG. 6, a computer architecture diagram that illustrates an illustrative architecture for a computer that can provide an illustrative operative environment for the technologies presented herein will be described. FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized in the implementations described herein. The illustrative computer architecture shown in FIG. 6 is for the computer 600 that includes a baseboard, or "motherboard", which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computer 600 and, possibly, to an on-board graphics adapter 610. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 630, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC '97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to a configuration, the PCH 606 includes a serial advanced technology attachment ("SATA") adapter for providing one or more serial ATA ports 616. The serial ATA ports 616 can be connected to one or more mass storage devices storing an OS, such as OS 502 and application programs 620, such as a SATA disk drive 618. As known to those skilled in the art, an OS comprises a set of programs that control operations of a computer and allocation of resources. An application program is software that runs on top of the operating system 502, or other runtime environment, and uses computer resources to perform application specific tasks desired by the user.

According to one configuration, the OS 502 comprises the LINUX operating system. According to another configuration, the OS 502 comprises the WINDOWS operating system from MICROSOFT CORPORATION. According to another configuration, the OS 502 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 640 for storing firmware 604 that includes program code containing the basic routines that help to start up the computer 600 and to transfer information between elements within the computer 600. The firmware 604 can be a multi-platform firmware, such as that contained in the multi-platform firmware image 112.

It should be appreciated that the program modules disclosed herein, including the firmware 604, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 640. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. The system management bus 634 can include a Baseboard Management Controller ("BMC") 636. In general, the BMC 636 is a microcontroller that monitors operation of the computer 600. In a more specific configuration, the BMC 636 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, the BMC 636 is communicatively connected to one or more components by way of the system management bus 634.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 600 can be provided by other types of computing devices, including hand-held computers, embedded computer systems, personal digital assistants, and other types of computing devices known to those skilled in the art. It is also contemplated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for multi-platform firmware support have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method for creating a single firmware image that supports multiple hardware platforms, comprising:
    receiving a first platform-specific firmware image containing executable code, the first platform-specific firmware image comprising a plurality of executable files for implementing a firmware for a first computing platform;
    receiving a second platform-specific firmware image containing executable code, the second platform-specific firmware image comprising a plurality of executable files for implementing a firmware for a second computing platform;
    identifying executable files that are the same in the plurality of executable files for implementing the firmware for the first computing platform and in the plurality of executable files for implementing the firmware for the second computing platform;
    identifying executable files contained in the plurality of executable files for implementing the firmware for the first computing platform that are not contained in the plurality of executable files for implementing the firmware for the second computing platform;
    identifying executable files contained in the plurality of executable files for implementing the firmware for the second computing platform that are not contained in the plurality of executable files for implementing the firmware for the first computing platform; and
    creating a single multi-platform firmware image by:
        storing the executable files that are the same in the first platform-specific firmware image containing executable code and the second platform-specific firmware image in a first volume of the single multi-platform firmware image;
        storing the executable files contained in the plurality of executable files for implementing the firmware for the first computing platform that are not contained in the plurality of executable files for implementing the firmware for the second computing platform in a second volume of the single multi-platform firmware image that is nested inside the first volume; and
        storing the executable files contained in the plurality of executable files for implementing the firmware for the second computing platform that are not contained in the plurality of executable files for implementing the firmware for the first computing platform in a third volume of the single multi-platform firmware image that is nested inside the first volume.

2. The computer-implemented method of claim 1, wherein the first platform-specific firmware image and the second platform-specific firmware image comprise firmware file system (FFS) images.

3. The computer-implemented method of claim 2, wherein the single multi-platform firmware image comprises a firmware file system (FFS) image.

4. The computer-implemented method of claim 1 wherein the single multi-platform firmware image further comprises a multiplatform driver configured to:
    identify a platform of a computing system by examining hardware of the computing system;
    determine that the platform of the computing system corresponds to the first computing platform;
    load the executable files from the first volume of the multi-platform firmware image into a random access memory of the computing system for execution; and
    load the executable files from the second volume of the multi-platform firmware image into the random access memory of the computing system for execution.

5. The computer-implemented method of claim 1, wherein the single multi-platform firmware image further comprises a multiplatform driver configured to:
    identify a platform of a computing system by examining hardware of the computing system;
    determine that the platform of the computing system corresponds to the second computing platform;
    load the executable files from the first volume of the multi-platform firmware image into a random access memory of the computing system for execution; and
    load the executable files from the third volume of the multi-platform firmware image into the random access memory of the computing system for execution.

6. The computer-implemented method of claim 1, wherein the single multi-platform firmware image further comprises a multiplatform driver configured to:
    identify a platform of a computing system by examining hardware of the computing system, wherein examining the hardware of the computing system comprises examining a configuration of general-purpose I/O ("GPIO") pins in the computing system.

7. The computer-implemented method of claim 1, further comprising:
    generating a report listing:
        the executable files that are the same in the plurality of executable files for implementing the firmware for the first computing platform and in the plurality of executable files for implementing the firmware for the second computing platform, identifying executable files contained in the plurality of executable files for implementing the firmware for the first computing platform that are not contained in the plurality of executable files for implementing the firmware for the second computing platform, and identifying executable files contained in the plurality of executable files for implementing the firmware for the second computing platform that are not contained in the plurality of executable files for implementing the firmware for the first computing platform; and wherein the single multi-platform firmware image is created based on the report.

8. A non-transitory computer-readable storage medium having computer-executable instructions stored thereupon which, when executed by a computer, cause the computer to:

identify executable files that are the same among executable files for implementing a firmware for a first computing platform and executable files for implementing a firmware for a second computing platform;

identify executable files contained in the executable files for implementing the firmware for the first computing platform that are not contained among the executable files for implementing the firmware for the second computing platform;

identify executable files contained in the executable files for implementing the firmware for the second computing platform that are not contained among the executable files for implementing the firmware for the first computing platform;

store the executable files that are the same among the executable files for implementing the firmware for the first computing platform and the executable files for implementing the firmware for the second computing platform in a first volume of a single multi-platform firmware image;

store the executable files contained in the executable files for implementing the firmware for the first computing platform that are not contained in the executable files for implementing the firmware for the second computing platform in a second volume of the single multi-platform firmware image that is nested inside the first volume; and store the executable files contained in the executable files for implementing the firmware for the second computing platform that are not contained in the executable files for implementing the firmware for the first computing platform in a third volume of the single multi-platform firmware image that is nested inside the first volume.

9. The non-transitory computer-readable storage medium of claim 8, wherein the executable files for implementing the firmware for the first computing platform and the executable files for implementing the firmware for the second computing platform comprise firmware file system (FFS) images, and the single multi-platform firmware image comprises a firmware file system (FFS) image.

10. The non-transitory computer-readable storage medium of claim 8, wherein the single multi-platform firmware image further comprises a multiplatform driver configured to:

identify a platform of a computing system by examining hardware of the computing system;

determine that the platform of the computing system corresponds to the first computing platform;

load files stored in the first volume of the single multi-platform firmware image into a random access memory of the computing system for execution; and load files stored in the second volume of the single multi-platform firmware image into the random access memory of the computing system for execution.

11. The non-transitory computer-readable storage medium of claim 8, wherein the single multi-platform firmware image further comprises a multiplatform driver configured to:

identify a platform of a computing system by examining hardware of the computing system;

determine that the platform of the computing system corresponds to the second computing platform;

load files stored in the first volume of the single multi-platform firmware image into a random access memory of the computing system for execution; and load files stored in the third volume of the single multi-platform firmware image into the random access memory of the computing system for execution.

12. The non-transitory computer-readable storage medium of claim 8, wherein:

the first computing platform comprises a first motherboard having a first hardware component, the second computing platform comprises a second motherboard having a second hardware component, the executable files that are the same among the executable files for implementing the firmware for the first computing platform and the executable files for implement in the firmware for the second computing platform comprise executable files associated with a chip set that is common to the first motherboard and the second motherboard, the executable files for implementing the firmware for the first computing platform that are not contained in the executable files for implementing the firmware for the second computing platform comprise executable files associated with the first hardware component, and the executable files for implementing the firmware for the second computing platform that are not contained in the executable files for implementing the firmware for the first computing platform comprise executable files associated with the second hardware component.

13. The non-transitory computer-readable storage medium of claim 8, wherein the computer-executable instructions further cause the computer to:

generate a report listing:

executable files that are the same among executable files for implementing the firmware for a first computing platform and executable files for implementing the firmware for a second computing platform, executable files contained in the executable files for implementing the firmware for the first computing platform that are not contained among the executable files for implementing the firmware for the second computing platform, and executable files contained in the executable files for implementing the firmware for the second computing platform that are not contained among the executable files for implementing the firmware for the first computing platform; and use the report to generate the single multi-platform firmware image.

14. A non-transitory computer-readable storage medium having computer-executable instructions stored thereupon which, when executed by a computer, cause the computer to:

identify a platform of the computer by examining hardware of the computer; and responsive to a determination that the platform of the computer corresponds to a first computing platform:

load executable files that are the same among executable files for the first computing platform and a second computing platform and are stored in a first volume of a single multi-platform firmware image into a random access memory of the computer for execution;

load executable files specific to the first computing platform that are stored in a second volume of the single multi-platform firmware image into the random access memory of the computer for execution, wherein the second volume is nested inside the first volume; and cause the files loaded into the random access memory to be executed.

15. The non-transitory computer-readable storage medium of claim 14, having further instructions stored thereupon to:

responsive to a determination that the platform of the computer corresponds to a second computing platform;

load executable files that are the same among executable files for the first computing platform and the second computing platform and are stored in the first volume of a single multi-platform firmware image into the random access memory of the computer for execution;

load executable files specific to the second computing platform that are stored in a third volume of the single multi-platform firmware image into the random access memory of the computer for execution, wherein the third volume is nested inside the first volume; and cause the files loaded into the random access memory to be executed.

16. The non-transitory computer-readable storage medium of claim 15, wherein the single multi-platform firmware image is created by:

identifying executable files that are the same among executable files for implementing a firmware for the first computing platform and executable files for implementing a firmware for the second computing platform;

identifying executable files from the executable files for implementing the firmware for the first computing platform that are not contained among the executable files for implementing the firmware for the second computing platform;

identifying executable files from the executable files for implementing the firmware for the second computing platform that are not contained among the executable files for implementing the firmware for the first computing platform;

creating the single multi-platform firmware image by:

storing the executable files that are the same among the executable files for implement in the firmware for the first computing platform and the executable files for implementing the firmware for the second computing platform in the first volume of the single multi-platform firmware image;

storing the executable files from the executable files for implementing the firmware for the first computing platform that are not contained in the executable files for implementing the firmware for the second computing platform in the second volume of the single multi-platform firmware image; and storing the executable files from the executable files for implementing the firmware for the second computing platform that are not contained in the executable files for implementing the firmware for the first computing platform in the third volume of the single multi-platform firmware image.

17. The non-transitory computer-readable storage medium of claim 16, wherein the executable files implementing the firmware for the first computing platform and executable files for implementing the firmware for the second computing platform comprise firmware file system (FFS) images.

18. The non-transitory computer-readable storage medium of claim 17, wherein the single multi-platform firmware image comprises a firmware file system (FFS) image.

19. The non-transitory computer-readable storage medium of claim 14, wherein examining the hardware of the computer comprises examining a configuration of general-purpose I/O ("GPIO") pins in the computer.

20. The non-transitory computer-readable storage medium of claim 16, wherein the computer-executable instructions further cause the computer to:

generate a report listing:

executable files that are the same among executable files for implementing the firmware for the first computing platform and executable files for implementing the firmware for the second computing platform, executable files contained in the executable files for implementing the firmware for the first computing platform that are not contained among the executable files for implementing the firmware for the second computing platform; and executable files contained in the executable files for implementing the firmware for the second computing platform that are not contained among the executable files for implementing the firmware for the first computing platform; and use the report to generate the single multi-platform firmware image.

* * * * *